(No Model.)

B. H. CHAMEROY.
WHEEL TIRE.

No. 594,601. Patented Nov. 30, 1897.

Witnesses:—
George Barry Jr.
Edward Gieser

Inventor:—
Bernard Hippolyte Chameroy
By attorneys
Brown & Seward

UNITED STATES PATENT OFFICE.

BERNARD HIPPOLYTE CHAMEROY, OF PARIS, FRANCE.

WHEEL-TIRE.

SPECIFICATION forming part of Letters Patent No. 594,601, dated November 30, 1897.

Application filed March 26, 1897. Serial No. 629,294. (No model.)

*To all whom it may concern:*

Be it known that I, BERNARD HIPPOLYTE CHAMEROY, of Paris, in the Republic of France, have invented a new and useful Improvement in Wheel-Tires, of which the following is a specification.

This invention relates to an improvement in tires for the wheels of all kinds of vehicles which presents all the advantages of a rubber tire without its inconveniences. A tire embodying my improvement possesses as great elasticity as a rubber tire, while as durable as a metallic tire. I obtain this durability and in part this elasticity by constituting the wearing-surface or tread of the tire of a large number of metallic segments which are independent of each other and interposing between these segments and the felly an elastic band of rubber, either solid or hollow; but my improvement consists in the novel construction and combination of the rubber band and metallic tread-segments hereinafter described, whereby the rubber band while retained in place by and retaining in place the said segments is to such extent unconfined laterally that it will yield sufficiently in the vertical direction in which the pressure comes upon it in use for the full practical development of its elasticity.

My invention is applicable to wheels of all kinds whether their fellies be of metal or wood.

I have represented, as an example, in the accompanying drawings a mode of carrying out the invention which will enable others skilled in the art to apply it practically.

Figure 1:
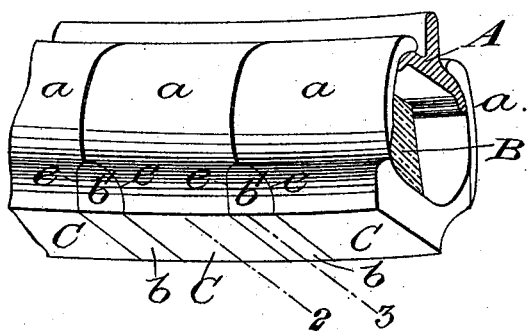
Figure 2:
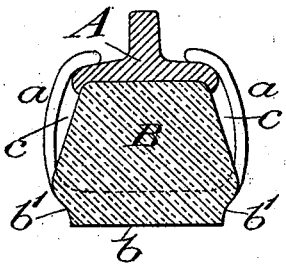
Figure 3:
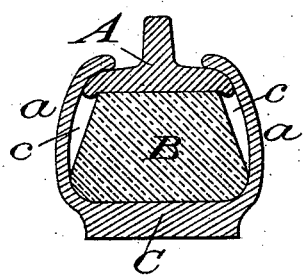
Figure 4:
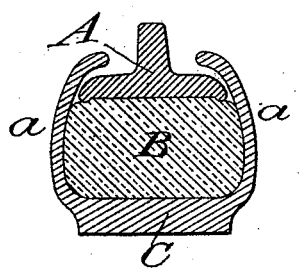

Figure 1 is a perspective view of portions of the tire and the felly to which it is applied. Fig. 2 represents a transverse section in the line 2 of Fig. 1; Figs. 3 and 4, transverse sections in the line 3 of Fig. 1, Fig. 3 showing the tire in its normal condition, and Fig. 4 showing its condition when subject to vertical pressure.

The felly A, which receives the rubber band B, is represented as constituted by a channel-iron of which the channel is presented outward. This channel receives the rubber band B, which, except at certain intervals $b$, is covered by the metallic segments C. These latter are furnished with wings $a$, the ends of which being turned inward engage with the sides of the felly and so retain the segments themselves and the rubber band in place.

For the mounting of the tire one of the wings $a$ of each segment is spread laterally, and after the rubber band B has been introduced into the channel of the felly the metallic segments C are placed thereon and secured by closing in their previously-spread wings on the contiguous edge of the felly.

For the purpose of preventing circumferential displacements of the segments C upon the felly, while allowing the segments the necessary liberty of movement in a radial direction, and also to prevent the adjacent segments from clashing during their movements, the segments C are hollowed out at their two extremities, as shown at $e\ e$ in Fig. 1, in such manner that a certain space is left between two adjacent segments in the tread of the tire. The spaces thus formed between the segments are filled by projections $b$ on the rubber band B. These projections serve effectively as stops to prevent the circumferential displacement of the segments upon the felly and to prevent the segments from striking each other; but they do not in any way prevent the displacement in the radial direction to transmit pressure to the band B in the passage of the wheel over the ground. The said projections at their sides $b'$ conform exactly to the profile of the segments in such manner that the circumference of the tire presents a continuous exterior surface without projections or recesses.

One important feature of the improvement is that the wings $a$ of the metallic segments and the sides or lateral faces of the rubber band are so formed and proportioned that in the normal condition of the band—that is to say, when no pressure is brought to bear upon the tire—the band is narrower than the space between the wings of the segments, as shown in Figs. 2 and 3, so that there are left between the band and the wings on each side of the band empty spaces $c\ c$, into which the band can be deformed or displaced laterally, as shown at Fig. 4, at those parts of its circumference whereon the pressure of the load on the wheel is successively brought to bear while the wheel is running. This provision for the lateral deformation of the band allows full play to the elasticity of the rubber, which is not possible with a rubber band fitted with metallic segments, which fit closely to its sides and so confine it laterally that it has within the segments no elasticity but such as might result from its actual compression.

What I claim as my invention is—

An elastic wheel-tire comprising in combination a felly, a band of elastic material placed around the felly and a series of independent metallic segments placed over said band and provided with wings which engage with the sides of the felly for retaining themselves and the band on the felly, said segments having spaces between their ends and said band having projections which fill the said spaces, and the said band and wings being relatively so proportioned in width that in their normal condition empty spaces are left between the said wings and the sides or lateral faces of the band, substantially as herein described.

In witness whereof I have hereunto set my hand in the presence of two subscribing witnesses.

BERNARD HIPPOLYTE CHAMEROY.

Witnesses:
 EDWARD P. MACLEAN,
 ALCIDE FABE.